(12) United States Patent
Pandey et al.

(10) Patent No.: US 11,216,474 B2
(45) Date of Patent: Jan. 4, 2022

(54) STATISTICAL PROCESSING OF NATURAL LANGUAGE QUERIES OF DATA SETS

(71) Applicant: Oracle International Corporation, Redwood Shores, CA (US)

(72) Inventors: Prashant Pandey, Jhansi (IN); Eakta Aggarwal, Hyderabad (IN); Richard Yungning Liu, Saratoga, CA (US); Robert Cooke Zwiebach, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 208 days.

(21) Appl. No.: 15/908,496

(22) Filed: Feb. 28, 2018

(65) Prior Publication Data

US 2019/0095500 A1 Mar. 28, 2019

Related U.S. Application Data

(60) Provisional application No. 62/564,909, filed on Sep. 28, 2017.

(51) Int. Cl.
G06F 16/2458 (2019.01)
G06F 16/28 (2019.01)
G06F 16/2455 (2019.01)
G06F 16/2457 (2019.01)

(52) U.S. Cl.
CPC ...... *G06F 16/2462* (2019.01); *G06F 16/2455* (2019.01); *G06F 16/24578* (2019.01); *G06F 16/288* (2019.01)

(58) Field of Classification Search
None
See application file for complete search history.

(56) References Cited

U.S. PATENT DOCUMENTS

| 6,026,388 | A | * | 2/2000 | Liddy | G06F 16/3329 |
| 2006/0287993 | A1 | * | 12/2006 | Yao | G06F 16/24578 |
| 2011/0004588 | A1 | * | 1/2011 | Leitersdorf | G06F 16/951 |
|  |  |  |  |  | 707/711 |
| 2012/0330946 | A1 | * | 12/2012 | Arredondo | G06F 16/24575 |
|  |  |  |  |  | 707/728 |
| 2017/0116260 | A1 | * | 4/2017 | Chattopadhyay | ............ |
|  |  |  |  |  | G06F 16/24522 |
| 2018/0081939 | A1 | * | 3/2018 | Hopeman | G06F 16/2456 |
| 2018/0247213 | A1 | * | 8/2018 | Ganjoo | G06N 7/005 |

* cited by examiner

*Primary Examiner* — Mark D Featherstone
*Assistant Examiner* — Samuel C Sharpless, III
(74) *Attorney, Agent, or Firm* — Invoke (57) ABSTRACT

Techniques for processing a natural language query are provided. The techniques include obtaining a set of statistics representing a contextual significance of a set of words in a data model for a data set. Next, the set of statistics is used to match a set of semantic intents for a natural language query of the data set to one or more data elements in the data model. The data element(s) and the data set are then to generate a result of the natural language query, and the result is provided in a response to the natural language query.

12 Claims, 3 Drawing Sheets

STATISTICAL PROCESSING OF NATURAL LANGUAGE QUERIES OF DATA SETS

TECHNICAL FIELD

The present disclosure relates to natural language queries. In particular, the present disclosure relates to techniques for performing statistical processing of natural language queries of data sets.

BACKGROUND

Text analytics and natural language processing techniques may be used to derive relevant or meaningful information from the text. For example, text analytics or natural language processing techniques may be used to perform tasks such as categorizing text, identifying topics or sentiments in the text, determining the relevance of the text to one or more topics, assessing the readability of the text, or understanding the context or intent associated with the text. In turn, text analytics may be used to mine insights from large document collections, process natural language commands or queries, or perform other tasks related to improving interaction with humans or understanding human languages.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. EXAMPLE EMBODIMENT
4. STATISTICAL PROCESSING OF NATURAL LANGUAGE QUERIES OF DATA SETS
5. COMPUTER NETWORKS AND CLOUD NETWORKS
6. MISCELLANEOUS; EXTENSIONS
7. HARDWARE OVERVIEW

1. General Overview

To simplify, streamline, or improve interaction between users and computer technologies, a query-processing system may match natural language (NL) queries to data requested by the users using the NL queries. In turn, the users may use the NL queries to retrieve, filter, aggregate, or otherwise access the data without manually locating the data, understanding the data model, or using a technical query language.

To enable processing of NL queries from the users, the system obtains or calculates statistics for words in a data model for a data set. For example, the system may obtain a schema for a relational database and obtain words from labels, names, or metadata describing data in various rows, columns, tables, or other data elements in the relational database. The system may use the metadata to calculate a term frequency (TF) and inverse document frequency (IDF) of each word. The system may also multiply the TF by a percentage representing the ratio of the word count of the word in a given data element to the total word count of the word in a larger grouping of data elements in the data model. The result of multiplying the TF by the ratio may be a score that reflects the contextual significance of the word in the data element.

When an NL query is received from a user, the system uses the statistics to match semantic intents for the NL query to one or more data elements in the data model. Continuing with the previous example, the system may use natural language processing (NLP) techniques to obtain the semantic intents as a subset of words in the NL query that are indicative of the meaning or intent of the NL query. The system may then aggregate, for a given data element of the data model, scores for all words matching the semantic intents into an overall score representing the relevance of the data element to the semantic intents.

When the system finds one or more data elements of the data model containing words that match all semantic intents, the system uses the data element(s) and the data set to generate a result of the NL query and provide the result in a response to the NL query. For example, the system may construct a database query to retrieve data associated with the data element(s) from a relational database and return the data in response to the NL query.

One or more embodiments described in this Specification or recited in the claims may not be included in this General Overview section.

2. Architectural Overview

Figure 1:
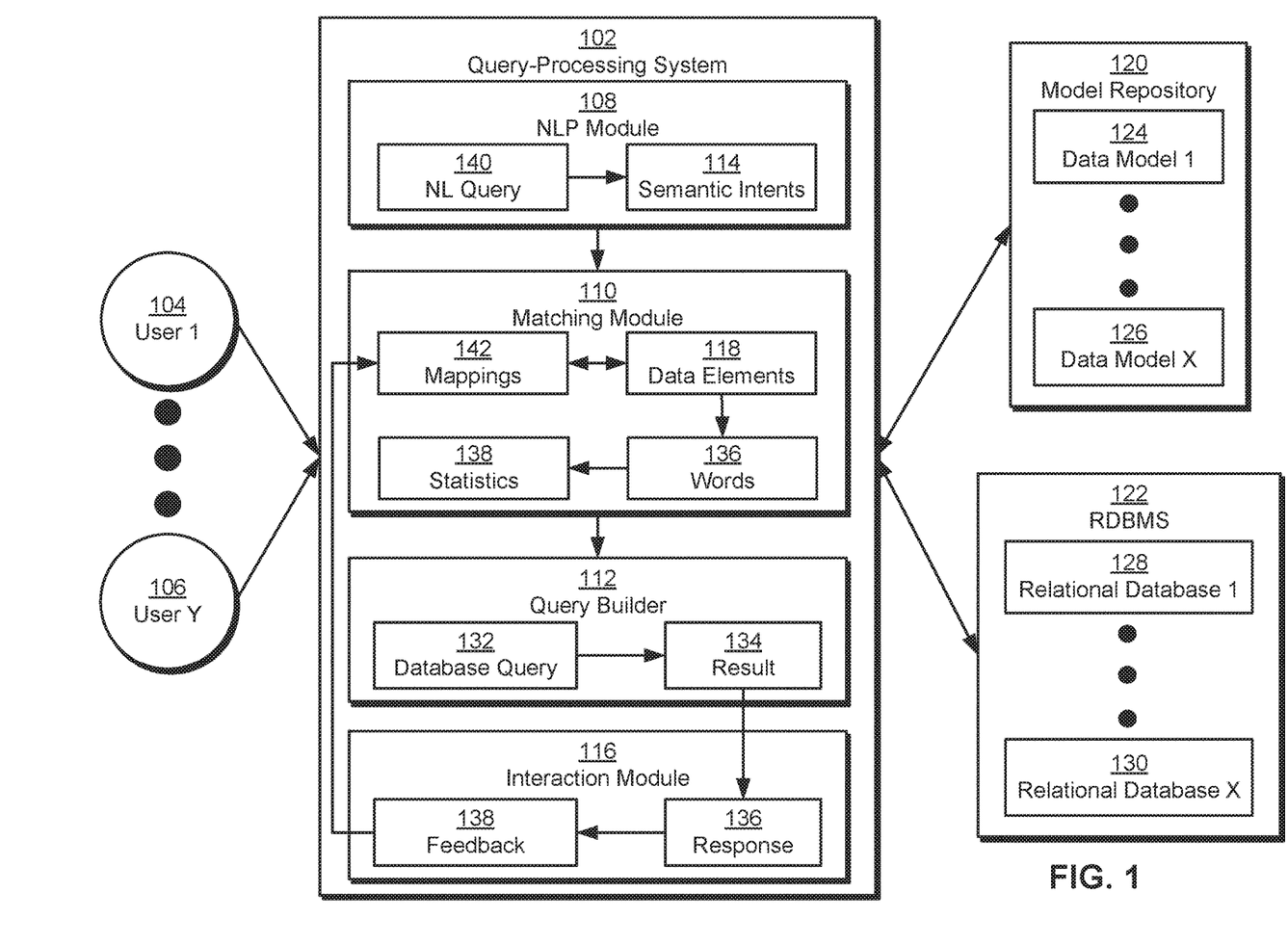
FIG. 1 illustrates a system in accordance with one or more embodiments.

FIG. 1 illustrates a system in accordance with one or more embodiments. As illustrated in FIG. 1, the system includes a query-processing system 102 that interacts with a set of users (e.g., user 1 104, user y 106). Query-processing system 102 may receive, from one or more of the users, a natural language (NL) query 140 of a data set stored in one or more relational databases (e.g., relational database 1 128, relational database x 130) such as Structured Query Language (SQL) databases. Query-processing system 102 includes a natural language processing (NLP) module 108, a matching module 110, and a query builder 112. Each of these components is described in further detail below.

NLP module 108 may use NLP techniques to obtain a set of semantic intents 114 from NL query 140. For example, NLP module 108 may use a grammar to generate a set of part-of-speech (POS) tags for words in NL query 140. NLP module 108 may also filter stop words that lack contextual meaning or significance (e.g., articles, prepositions, pronouns, conjunctions, particles, or other function words) from NL query 140. NLP module 108 may also, or instead, perform stemming of the remaining words in NL query 140. NLP module 108 may then match the POS tags to one or more patterns to extract one or more words representing semantic intents 114 from NL query 140. In other words, semantic intents 114 may include words in NL query 140 that are indicative of the meaning or intent of NL query 140.

Next, matching module 110 may match semantic intents 114 to one or more data elements 118 of a data model (e.g., data model 1 124, data model x 126) for the data set. For example, the data model may include a schema for one or more relational databases in an RDBMS 122. Matching module 110 may identify the data model using one or more parameters associated with NL query 140 or the user. Matching module 110 may then retrieve the data model from a model repository 120. For example, matching module 110 may match one or more permissions for the user or a context in which NL query 140 is received (e.g., a screen of a user interface used to obtain NL query 140) to a relational database in RDBMS 122. Matching module 110 may then obtain a schema for the relational database from model repository 120.

In particular, matching module 110 may use a set of statistics 138 representing the contextual significance of words 136 in data elements 118 of the data model to match semantic intents 114 to one or more data elements 118 of the data model. Matching module 110 or another component of the system may calculate statistics 138 based on the frequencies or word counts of words 136 in data elements 118. Such statistics 138 may be proportional to the relative frequency of words 136 within individual data elements 118 (e.g., term frequencies). Statistics 138 may also, or instead, be discounted based on the relative frequency of words 136 across multiple data elements 118 (e.g., document frequencies).

The calculation of statistics 138 may be illustrated with an exemplary data model that includes a hierarchy of data elements representing a business intelligence data set. The exemplary data model may identify or define each data element using a label or name and include optional metadata describing the data in the data element. The highest level of the data model includes data elements representing business intelligence "subject areas," such as a subject area with a name of "Payables Payments—Disbursements Real Time" and a description of "Real time information on amount spent or expensed." The next level of the data model includes data elements representing "folders" that are grouped under the subject areas. For example, the "Payables Payments—Disbursements Real Time" may include a folder with a name of "Payment Information" and a description of "Provides payment information on payments issued to suppliers as well as refunds received from them." The third level of the data model includes data elements representing "columns" containing specific data fields that are grouped under the folders. Continuing with the previous example, the "Payment Information" folder may include columns named "Check Number," "Entered Currency Name," "Payment Status," and "Payment Type." The "Payment Status" column may have a description of "Status of a payment," and the "Payment Type" column may have a description of "Category of payment such as quick, manual, or refund."

The component may generate word counts for individual words in each column. Next, the component may aggregate the word counts for a grouping of columns under each folder to produce word counts at the folder level. The component may then aggregate the word counts for a grouping of folders under each subject area to produce word counts at the subject area level. Prior to generating the word counts, the component may filter stop words that lack contextual meaning or significance (e.g., articles, prepositions, pronouns, conjunctions, particles, or other function words) from the words in the data elements or perform stemming of remaining words.

Continuing with the previous example, the component may generate word counts for the "Payment Type" column by filtering the words "of," "as," and "or" and producing word counts of 2 for "payment" and 1 for "such," "quick," "type," "category," "manual," and "refund." The component may aggregate (e.g., sum) word counts for "Payment Type," "Check Number," "Entered Currency Name," "Payment Status," and other columns in the "Payment Information" folder into folder-level word counts of 11 for "payment," 6 for "bank," 4 for "check," 2 for "refund," and so on. The component may then aggregate word counts for the "Payment Information" folder and other folders in the "Payables Payments—Disbursements Real Time" into higher word counts of 81 for "payment," 32 for "ledger," 39 for "fiscal," 30 for "supplier," 26 for "invoice," 25 for "accounting," and so on for the "Payables Payments—Disbursements Real Time" subject area.

The component may also calculate, for one or more levels of data elements in the hierarchy, a term frequency (TF) and inverse document frequency (IDF) of each word at each of the levels. In particular, the component may obtain the TF by dividing the word count of the word in a given data element (e.g., subject area) by the total number of words in the data element. The component may calculate the IDF as the logarithm of the number of data elements in a grouping containing the data element divided by the number of data elements in the grouping in which the word appears.

The component may additionally multiply the TF by a percentage representing the ratio of the word count of the word in the data element to the total word count of the word in the grouping of data elements (e.g., set of subject areas) to obtain a score that reflects the contextual significance of the word in the data element. For example, the data model may include data elements for 10 subject areas, and a given subject area in the data model may have 1200 total words. A word in the data model may have a word count of 80 in the subject area and a word count of 120 across all of the subject areas. The word may also appear in three out of the 10 subject areas. As a result, the word may have a TF of 80/1200 and an IDF of log(10/3). A score for the word in the subject area may then be calculated as (80/1200)*(80/120*100), or 4.44.

The component may further generate statistics 138 related to the frequency or distribution of all words 136 in the data model. For example, the component may calculate a maximum IDF for all data elements representing subject areas in the data model as log(N), where N represents the number of subject areas. The component may also set a "threshold" IDF to a value representing occurrence of the word in at most 70% of the subject areas, or log(1/0.7). The threshold IDF may represent a minimum IDF to be attained by a word for the word to have individual contextual significance within the data model. Thus, a word that occurs in more than 70% of the subject areas may lack individual contextual significance in the data model, while a word that occurs in fewer than 70% of the subject areas may have individual contextual significance in the data model.

In turn, components of the system may use the IDF values to determine the functional usage or context of the corresponding data elements. For example, the components may determine the type of data stored in a subject area by obtaining a list of a pre-specified number or percentage of the most frequently occurring words in the subject area. The components may then remove words that do not meet the threshold IDF from the list.

After statistics 138 are calculated for all relevant words 136 at various levels of the data model, the component may store statistics 138 in a dictionary structure. For example, the dictionary structure may include a root node representing the data model and a set of child nodes representing words in labels or metadata in the data model. The root node may include the maximum IDF and threshold IDF for subject areas in the data model. Each child node may include a mapping from a word to the IDF for the word (e.g., "Name: account, IDF: 0.0"). Each child node may also point to a linked list or other structure storing word counts, scores, or other statistics related to the corresponding word for a variable number of subject areas or other data elements in which the word appears (e.g., "count: 599, score: 0.00725, subject area: General Ledger—Transactional Balances Real Time").

Matching module 110 may then use statistics 138 to identify one or more data elements 118 in the data model that are most likely to be relevant to semantic intents 114 of NL query 140. Continuing with the exemplary hierarchical data model for the business intelligence data set, matching module 110 may use the dictionary to identify all subject areas in which all semantic intents 114 are found. Next, matching module 110 may aggregate, for each of the identified subject areas, scores from statistics 138 for all words matching semantic intents 114 into an overall score representing the relevance of the subject area to semantic intents 114. Conversely, if no subject area contains words that match all semantic intents 114, matching module 110 may return an empty set of data elements 118 in response to NL query 140. The user may, in turn, use other mechanisms (e.g., traditional querying of RDBMS 122, manual searching or browsing of the data set, etc.) to retrieve the requested data.

When a subject area with a highest overall score for semantic intents 114 is found, matching module 110 may repeat the matching process with folders and columns in the subject area. For example, matching module 110 may identify all folders in which all semantic intents 114 are found. Matching module 110 may then use statistics 138 to calculate overall scores representing the relevance of the folders to all semantic intents 114. Matching module 110 may further list the folders in descending order of overall score and search the folders in order for columns containing all semantic intents 114.

When a folder includes one or more columns containing all semantic intents 114, matching module 110 may calculate one or more overall scores representing the relevance of the column(s) to all semantic intents 114. Next, matching module 110 may select one or more columns with the highest overall score as a final match for semantic intents 114. If none of the columns in the folder contain all semantic intents 114, matching module 110 may search the next folder in the list (e.g., the folder with the next highest overall score) for columns containing all semantic intents 114. If none of the folders in the subject area have any columns containing all semantic intents 114, matching module 110 may repeat the search using the subject area with the next highest overall score for semantic intents 114. Finally, if none of the folders in any of the subject areas contain words that match all semantic intents 114, matching module 110 may return an empty set of data elements 118 in response to NL query 140.

When semantic attributes 114 of a given NL query 140 can be matched to one or more data elements 118 of the data model, a query builder 112 in query-processing system 102 may construct a database query 132 to retrieve data associated with data elements 118 from RDBMS 122. In turn, query builder 112 may obtain the data in a result 134 of database query 132 from RDBMS 122. For example, query builder 112 may use POS tags or other metadata associated with semantic attributes 114 from NLP module 108 to organize data elements 118 into a SQL query. Next, query builder 112 may transmit the SQL query to RDBMS 122. Query builder 112 may then receive result 134 as one or more database rows or columns from RDBMS 122.

Finally, an interaction module 116 may provide result 134 in a response 136 to NL query 140. For example, interaction module 116 may display, export, or transmit rows, columns, or other data returned by RDBMS 122 to the user. Interaction module 116 may optionally format or organize the data prior to including the data in response 136.

Interaction module 116 may also obtain feedback 138 related to response 136 from the user. For example, interaction module 116 may ask the user for feedback 138 related to the accuracy or relevance of response 136 to NL query 140. If the user provides positive feedback 138 (e.g., feedback indicating that response 136 is accurate or relevant), interaction module 116, matching module 110, or another component of the system may store one or more mappings 142 of one or more semantic intents 114 in NL query 140 to one or more data elements 118 matched to semantic intents 114. For example, the component may map individual words or groups of words in semantic intents 114 to subject areas, folders, or columns containing the words. If feedback 138 is negative (e.g., indicating that response 136 is not accurate or relevant), the component may omit the creation of mappings 142 of semantic intents 114 to data elements 118.

In turn, query-processing system 102 may use mappings 142 to process a subsequent NL query 140 containing some or all of the same semantic intents 114. For example, one or more components of query-processing system may use mappings 142 to identify one or more subject areas, folders, or columns containing one or more semantic intents 114 in the subsequent NL query 140. As a result, mappings 142 may reduce the search space of matching module 110 or expedite resolution of data elements 118 matching semantic intents 114.

By matching semantic intents 114 of NL queries (e.g., NL query 140) to a subset of data elements 118 of a data model and using the data elements and corresponding parts of the data set to generate results (e.g., result 134) of the NL queries, query-processing system 102 may allow users to query the data set without requiring the users to manually locate the data, understand the data model, or use a query language associated with RDBMS 122. Consequently, the system of FIG. 1 may improve the use of computer systems and storage technologies by reducing user overhead or error during interaction with the computer systems and storage technologies. The system of FIG. 1 may additionally increase the available methods for retrieving data using the computer systems and storage technologies.

In one or more embodiments, the system may include more or fewer components than the components illustrated in FIG. 1. For example, query-processing system 102 may convert NL queries into queries of data sets stored in other types of data stores, such as graph databases, hierarchical databases, flat files, file systems, or logs. In another example, NLP module 108, matching module 110, query builder 112, and interaction module 116 may include, execute with, or exclude one another. Such components may be local to or remote from each other, implemented in software or hardware, or distributed over multiple applications or machines. Multiple components may also be combined into one application or machine. Operations described with respect to one component may instead be performed by another component.

Additional embodiments or examples relating to computer networks are described below in Section 5, titled "Computer Networks and Cloud Networks."

In one or more embodiments, a data repository (e.g., model repository 120, RDBMS 122) is any type of physical or virtual storage unit or device (e.g., a file system, database, collection of tables, or any other storage mechanism) for storing data. Further, the data repository may include multiple different storage units or devices. The multiple different storage units or devices may or may not be of the same type or located at the same physical site. The data repository may be implemented or may execute on the same computing system as NLP module 108, matching module 110, query builder 112, or interaction module 116 or on a computing system that is separate from NLP module 108, matching module 110, query builder 112, or interaction module 116. The data repository may be communicatively coupled to NLP module 108, matching module 110, query builder 112, or interaction module 116 via a direct connection or via a network.

In one or more embodiments, query-processing system 102 refers to hardware or software configured to process NL queries of data sets. Examples of such operations are described below.

In an embodiment, query-processing system 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver or transmitter, a base station, a communication management device, a router, a switch, a controller, an access point, or a client device.

3. Example Embodiment

A detailed example is described below for purposes of clarity. Components or operations described below should be understood as one specific example, which may not be applicable to certain embodiments. Accordingly, components or operations described below should not be construed as limiting the scope of any of the claims.

The operation of query-processing system 102 may be illustrated using an exemplary NL query of "How many invoices are due today?" First, NLP module 108 may use NLP techniques to identify contextually significant tokens of "how," "invoices," "due," and "today" in the NL query. NLP module 108 may also generate the corresponding POS tags of WRB, NN, JJ, and NN for the tokens. Next, NLP module 108 may match the POS tags to a tagging pattern of ((VB[NZD] NN)||NN)+(JJ|VBD|VBN) (NN|(IN (CD|CC| (NN (CD|CC|\.))))) to produce an intermediate query of "Select: invoice, Filters: {due:today}" and semantic intents 114 of "invoice" and "due."

Next, matching module 110 may use statistics 138 to generate a list of subject areas containing words that match all semantic intents 114. Matching module 110 may also calculate overall scores for the subject areas and semantic intents 114. Matching module 110 may then order the subject areas by the overall scores to obtain the following top 5 subject areas and overall scores:

Payables Invoices—Transactions Real Time: 1.2379466519341003
Payables Invoices—Holds Real Time: 0.9593195184078963
Budgetary Control—Transactions Real Time: 0.5341461480063
Payables Invoices—Installments Real Time: 0.43422228446436206
Payables Payments—Disbursements Real Time: 0.12737260114138838

Matching module 110 may search the subject areas in descending order of overall score for folders or columns containing all semantic intents 114. First, matching module 110 may check, for the subject area with the highest overall score (i.e., "Payables Invoices—Transactions Real Time"), mappings 142 for data elements 118 matching all semantic intents 114. When mappings 142 for all semantic intents 114 are not found, matching module 110 may use statistics 138 to search the folders or columns for data elements 118. Matching module 110 may repeat the process with subsequent subject areas in the list until "invoice" is matched to a column named "General Information". "Invoice Number" using mappings 142 and a column named "Invoices Installment Details"."Due Date" is found in the "Payables Invoices—Installments Real Time" subject area.

Query builder 112 may then construct the following SQL query using semantic intents 114 and the identified data elements 118:

SELECT "General Information"."Invoice Number"
  FROM "Payables Invoices—Installments Real Time"
  WHERE "Invoices Installment Details"."Due Date"=CURRENT_DATE Query builder 112 may transmit the SQL query to RDBMS 122. RDBMS 122 may process the SQL query and return a set of database rows matching the SQL query. In turn, interaction module 116 may include the database rows or a count of the database rows in response 136.

4. Statistical Processing of Natural Language Queries of Data Sets

Figure 2:
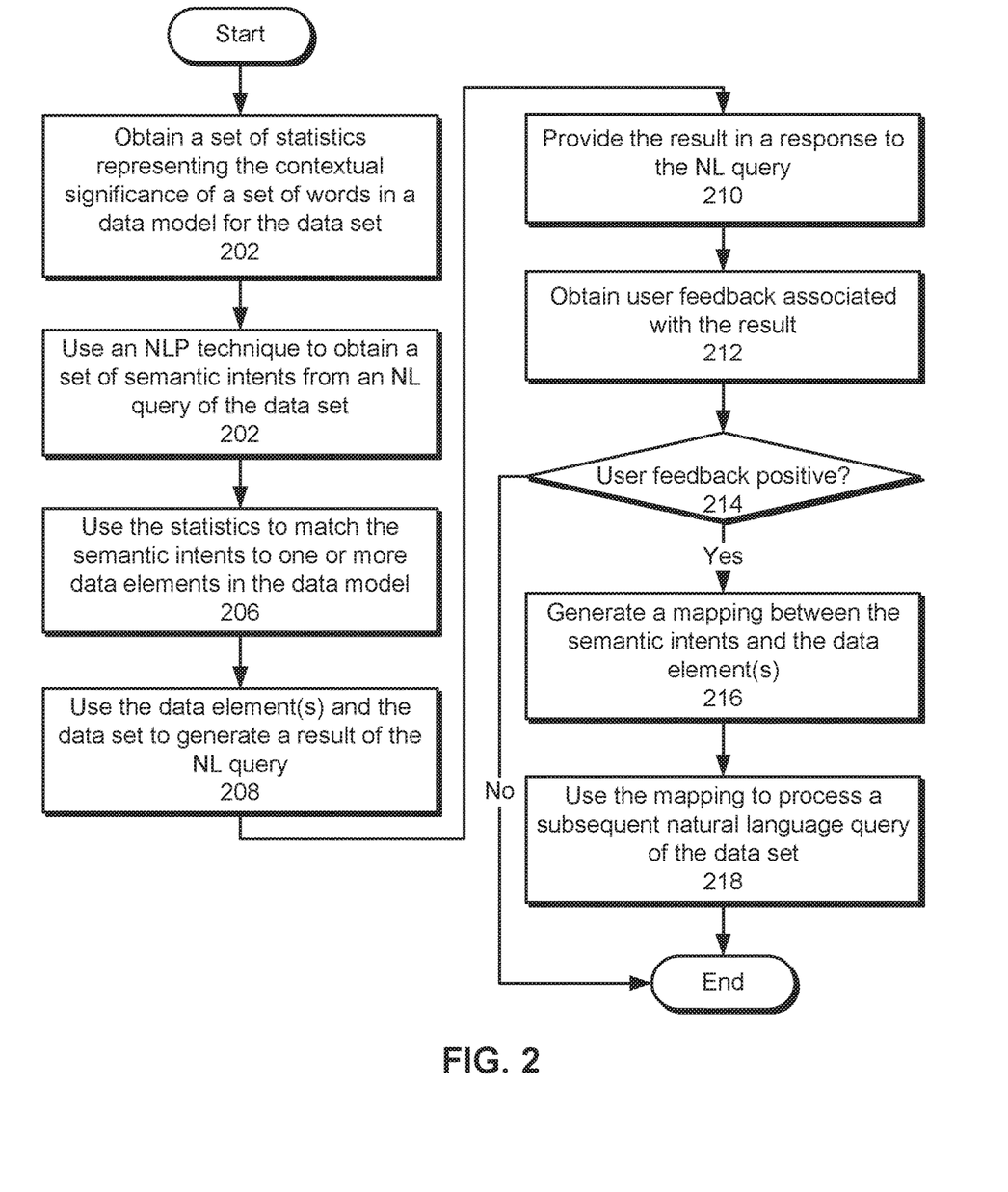
FIG. 2 illustrates a flowchart of processing a natural language query of a data set in accordance with one or more embodiments.

FIG. 2 illustrates a flowchart of processing an NL query of a data set in accordance with one or more embodiments. In one or more embodiments, one or more of the steps may be omitted, repeated, or performed in a different order. Accordingly, the specific arrangement of steps shown in FIG. 2 should not be construed as limiting the scope of the embodiments.

Initially, a system obtains a set of statistics representing the contextual significance of a set of words in a data model for the data set (operation 204). For example, the system obtains a grouping of data elements in the data model. For each data element in the grouping of data elements, the system calculates a ratio of a first word count for a word in the data element to a second word count of the word in the grouping of data elements. The system also multiplies the ratio by a TF of the word to obtain a score for the word. The system further includes the score in the set of statistics. The system additionally includes an IDF for the word, a maximum IDF for the grouping of data elements, and a threshold IDF for the grouping of data elements in the set of statistics. The system may repeat the process for other data elements or groupings in the data model. The system then stores the statistics a dictionary or other data structure for subsequent lookup.

Next, the system uses an NLP technique to obtain a set of semantic intents from an NL query of the data set (operation 204). For example, the NLP technique may filter stop words from the NL query, perform stemming of the remaining words, or use a grammar to generate a set of POS tags for the remaining words. The system may then use the POS tags to include some or all of the remaining words in the set of semantic intents.

The system then uses the statistics to match the semantic intents to one or more data elements in the data model (operation 206). For example, the data model may include a hierarchy of data elements grouped under one or more other levels of data elements. As a result, the system may use the statistics to calculate a first set of scores representing the contextual significance of the semantic intents in a first set of data elements. Next, the system may use the first set of scores to match the semantic intents to a first data element with a highest score in the first set of data elements. The system then obtains a second set of data elements grouped under the first data element. The system also uses the statistics to calculate a second set of scores representing the contextual significance of the set of semantic intents in the second set of data elements. The system further uses the second set of scores to match the semantic intents to one or more data elements in the second set of data elements. The system may repeat the process for subsequent groupings of data elements in the data model until one or more of the lowest-level data elements are matched to the semantic intents.

The system uses data element(s) identified in operation 206 and the data set to generate a result of the NL query (operation 208). The system also provides the result in a response to the NL query (operation 210). For example, the system may use the semantic intents or associated POS tags to format the data elements within a SQL query. Next, the system executes the SQL query against a relational database or other data store to obtain the result. The result may then be displayed, transmitted, or otherwise outputted in a response to the NL query.

Finally, user feedback associated with the result is obtained (operation 212) and examined to determine if the user feedback is positive (operation 214) or negative. For example, the user may provide positive user feedback when the result is relevant to the NL query or accurate. On the other hand, the user may provide negative user feedback when the result is not relevant to the NL query or inaccurate.

If the user feedback is positive, the system generates a mapping between the semantic intents and the data element (s) (operation 216). The system then uses the mapping to process a subsequent NL query of the data set (operation 218). For example, the system may use the mapping to identify one or more data elements of the data model that score the highest with respect to one or more semantic intents in the NL query. In turn, the mapping may be used to retrieve the data elements for subsequent NL queries that contain the same semantic intent(s).

Conversely, if the user feedback is not positive, the system may omit mapping of semantic intents in the NL query to data elements in the data model. Instead, the system may modify the statistics or techniques for using the statistics to match semantic intents to data elements of the data model to improve subsequent processing of NL queries of the data set.

5. Computer Networks and Cloud Networks

In one or more embodiments, a computer network provides connectivity among a set of nodes. The nodes may be local to or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process or a server process. A client process makes a request for a computing service (such as, execution of a particular application, or storage of a particular amount of data). A server process responds by executing the requested service or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device or a software process (such as, a virtual machine, an application instance, or a thread). A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application-programming interface (API).

In an embodiment, a computer network provides connectivity between clients and network resources. Network resources include hardware or software configured to execute server processes. Examples of network resources include a processor, a data storage, a virtual machine, a container, or a software application. Network resources are shared amongst multiple clients. Clients request computing services from a computer network independently of each other. Network resources are dynamically assigned to the requests or clients on an on-demand basis. Network resources assigned to each request or client may be scaled up or down based on, for example, (a) the computing services requested by a particular client, (b) the aggregated computing services requested by a particular tenant, or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times or at the same time. The network resources may be local to or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, or consistency. The same computer network may need to implement different network requirements demanded by different tenants.

In one or more embodiments, in a multi-tenant computer network, tenant isolation is implemented to ensure that the applications or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure or dataset, stored by the computer network, is tagged with a tenant ID. A tenant is permitted access to a particular application, data structure, or dataset only if the tenant and the particular application, data structure, or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein or recited in any of the claims below.

In an embodiment, a non-transitory computer readable storage medium comprises instructions which, when executed by one or more hardware processors, causes performance of any of the operations described herein or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired or program logic to implement the techniques.

Figure 3:
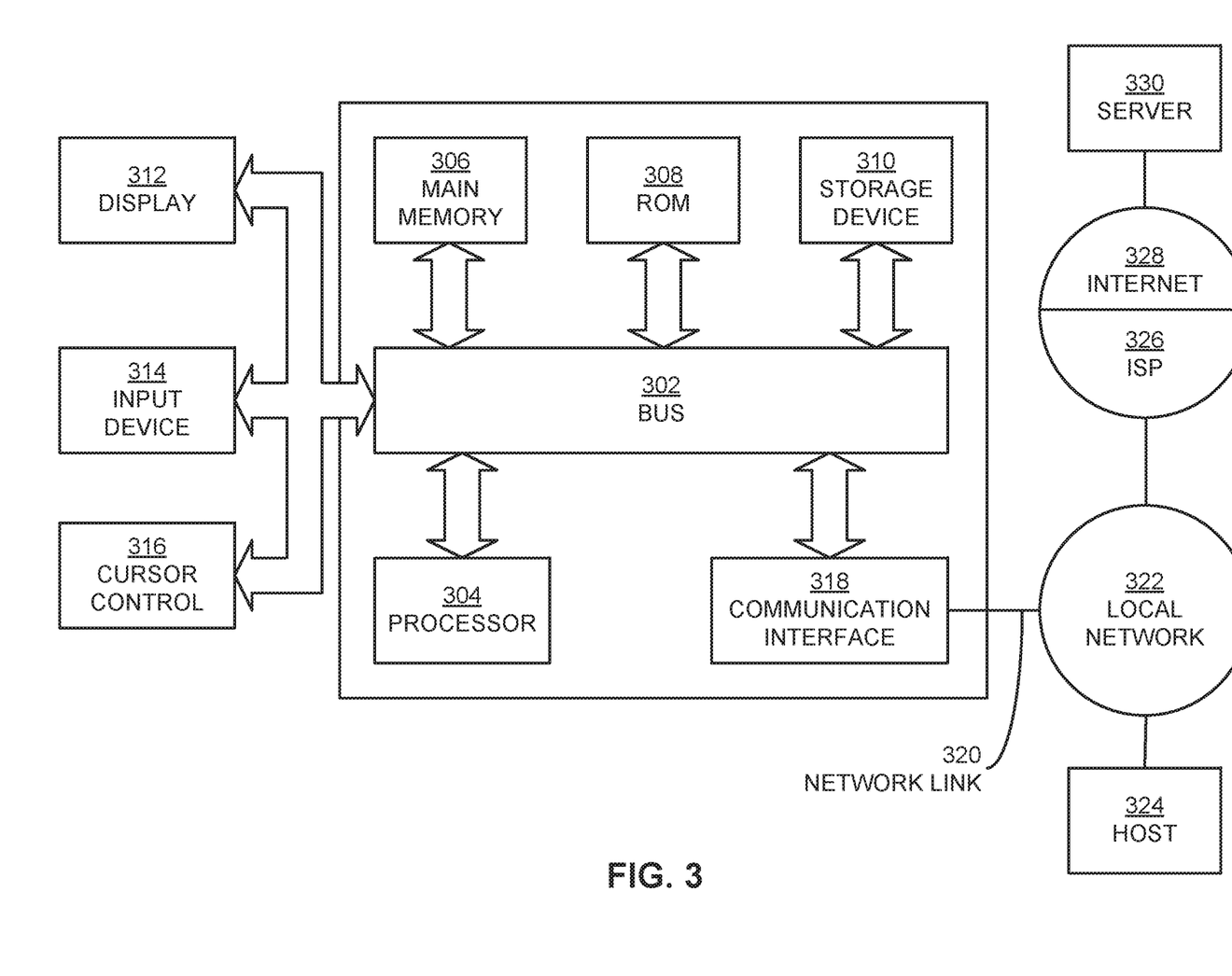
FIG. 3 shows a block diagram that illustrates a computer system in accordance with one or more embodiments.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data or instructions that cause a machine to operate in a specific fashion. Such storage media may comprise non-volatile media or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, optical tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   identifying a first subset of words in a natural language query as a set of semantic intents of the natural language query;
   determining that a particular data element, in a data model of a data set, corresponds to the semantic intents of the natural language query at least by:
      determining that the set of semantic intents for the natural language query matches a second subset of words in the data model of the data set;
      obtaining a first set of statistics comprising a plurality of scores, the plurality of scores comprising a score for each of the second subset of words, the scores of the second subset of words respectively representing a contextual significance of each of the second subset of words to the particular data element;
      based on the plurality of scores of the second subset of words, computing a first overall score representing a relevance of the particular data element to the semantic intents of the natural language query;
      determining that the particular data element corresponds to the semantic intents of the natural language query based at least on the first overall score;
   constructing a database query based at least on the particular data element determined to correspond to the semantic intents of the natural language query; and
   executing the database query to generate a result of the natural language query.

2. The medium of claim 1, wherein obtaining the first set of statistics comprises:
   for the particular:
      calculating a ratio of a first word count for a word, selected from the second subset of words, in the data element to a second word count of the word in a group of data elements in the data model;
      multiplying the ratio by a term frequency of the word to obtain a second score for the word; and
      including the second score in the first set of statistics.

3. The medium of claim 2, wherein obtaining the first set of statistics comprises:
   including an inverse document frequency for the word, a maximum inverse document frequency for the group of data elements, and a threshold inverse document frequency for the group of data elements in the first set of statistics.

4. The medium of claim 1, wherein obtaining the first set of statistics representing the contextual significance of the set of words in the data model for the data set comprises:
   storing the set of statistics in a dictionary structure.

5. The medium of claim 1, wherein using the first set of statistics for determining that the particular data element corresponds semantic intents of the natural language query further comprises:
   obtaining a second data element under the particular data element;
   using the first set of statistics to calculate a second score representing the contextual significance of each word of a third subset of words from the second subset of words in the second set of data element;
   based on the second scores of each word of the third subset of words, computing a second overall score representing a second relevance of the second data element to the semantic intents of the natural language query;
   determining that the second data element corresponds to the semantic intents of the natural language query based at least on the second overall score; and
   updating the database query based at least on the second data element determined to correspond to the semantic intents of the natural language query.

6. The medium of claim 1, wherein the query comprises a relational database query.

7. The medium of claim 1, wherein the operations further comprise:
   using a natural-language processing (NLP) technique to obtain the set of semantic intents from the natural language query.

8. The medium of claim 7, wherein using the NLP technique to obtain the set of semantic intents from the natural language query comprises at least one of:
   filtering one or more stop words from the natural language query to obtain one or more remaining words;
   stemming the one or more remaining words; and generating parts-of-speech (POS) tags for the one or more remaining words.

9. A method, comprising:

identifying a first subset of words in a natural language query as a set of semantic intents of the natural language query;

determining that a particular data element, in a data model of a data set, corresponds to the semantic intents of the natural language query at least by:

determining that the set of semantic intents for the natural language query matches a second subset of words in the data model of the data set;

obtaining a first set of statistics comprising a plurality of scores, the plurality of scores comprising a score for each of the second subset of words, the scores of the second subset of words respectively representing a contextual significance of each of the second subset words to the particular data element;

based on the plurality of scores of the second subset of words, computing a first overall score representing a relevance of the particular data element to the semantic intents of the natural language query;

determining that the particular data element corresponds to the semantic intents of the natural language query based at least on the first overall score;

constructing a database query based at least on the particular data element determined to correspond to the semantic intents of the natural language query; and executing the database query to generate, by the computer system, a result of the natural language query.

10. The method of claim 9, wherein obtaining the first set of statistics comprises:

for the particular data element:

calculating a ratio of a first word count for a word, selected from the second subset of words, in the data element to a second word count of the word in a group of data elements in the data model;

multiplying the ratio by a term frequency of the word to obtain a second score for the word; and including the second score in the first set of statistics.

11. The method of claim 9, wherein using the first set of statistics for determining that the particular data element corresponds to the semantic intents of the natural language query further comprises:

obtaining a second data element under the particular data element;

using the first set of statistics to calculate a second score representing the contextual significance of each word of a third subset of words from the second subset of words in the second set of data element;

based on the second scores of each word of the third subset of words, computing a second overall score representing a second relevance of the second data element to the semantic intents of the natural language query, and determining that the second data element corresponds to the semantic intents of the natural language query based at least on the second overall score.

12. An apparatus, comprising:

one or more processors; and memory storing instructions that, when executed by the one or more processors, cause the apparatus to:

identify a first subset of words in a natural language query as a set of semantic intents of the natural language query;

determine that a particular data element, in a data model of a data set, corresponds to the semantic intents of the natural language query at least by:

determine that the set of semantic intents for the natural language query matches a second subset of words in the data model of the data set;

obtain a first set of statistics comprising a plurality of scores, the plurality of scores comprising a score for each of the second subset of words, the scores of the second subset of words respectively representing a contextual significance of each of the second subset words to the particular data element;

based on the plurality of scores of the second subset of words, computing a first overall score representing a relevance of the particular data element to the semantic intents of the natural language query;

determining that the particular data element corresponds to the semantic intents of the natural language query based at least on the first overall score;

construct a database query based at least on the particular data element determined to correspond to the semantic intents of the natural language query; and execute the database query to generate a result of the natural language query.

* * * * *

UNITED STATES PATENT AND TRADEMARK OFFICE
CERTIFICATE OF CORRECTION

| | |
|---|---|
| PATENT NO. | : 11,216,474 B2 |
| APPLICATION NO. | : 15/908496 |
| DATED | : January 4, 2022 |
| INVENTOR(S) | : Pandey et al. |

It is certified that error appears in the above-identified patent and that said Letters Patent is hereby corrected as shown below:

In the Specification

In Column 1, Line 3, below "SETS" insert -- BENEFIT CLAIMS
This application claims the benefit of U.S. Provisional Patent Application 62/564,909, filed Sep. 28, 2017, which is hereby incorporated by reference. --, therefor.

In Column 8, Line 1, delete "((VB[NZD] NN)||NN)" and insert -- ((VB[NZD] NN)|NN) --, therefor.

Signed and Sealed this
Twenty-fourth Day of May, 2022

Katherine Kelly Vidal
*Director of the United States Patent and Trademark Office*